(12) United States Patent
Hanchett et al.

(10) Patent No.: US 9,377,161 B2
(45) Date of Patent: Jun. 28, 2016

(54) BRACKET FOR MOUNTING TO ONE OR MORE SHEETS

(71) Applicant: TASER International, Inc., Scottsdale, AZ (US)

(72) Inventors: Mark A. Hanchett, Mesa, AZ (US); James A. Bertin, San Jose, CA (US); John W. Wilson, Phoenix, AZ (US)

(73) Assignee: TASER International, Inc., Scottsdale, AZ (US)

( * ) Notice: Subject to any disclaimer, the term of this patent is extended or adjusted under 35 U.S.C. 154(b) by 0 days.

(21) Appl. No.: 14/059,720

(22) Filed: Oct. 22, 2013

(65) Prior Publication Data

US 2015/0108298 A1   Apr. 23, 2015

(51) Int. Cl.
*F16M 13/02*   (2006.01)
*F16M 13/04*   (2006.01)
*A45F 5/02*   (2006.01)

(52) U.S. Cl.
CPC ............ *F16M 13/022* (2013.01); *A45F 5/02* (2013.01); *F16M 13/04* (2013.01); *A45F 2005/023* (2013.01); *Y10T 24/1394* (2015.01); *Y10T 24/44017* (2015.01)

(58) Field of Classification Search
CPC ............ F16B 2/00; F16B 5/06; A45F 5/02; A45F 2200/00; A45F 2005/023; Y10T 24/1394; Y10T 24/344; Y10T 24/44017; A41F 1/00; F16M 13/022
USPC ............. 248/300, 316.7; 224/194, 269; 2/6.2, 2/422, 10, 94, 209.13, 336, 249
See application file for complete search history.

(56) References Cited

U.S. PATENT DOCUMENTS 3,374,508 A * 3/1968 Slimovitz ............... 24/3.1
3,921,253 A * 11/1975 Nelson ............. E05D 1/02
16/257

(Continued)

FOREIGN PATENT DOCUMENTS

DE   202008010477 U1 * 11/2008
GB        901528        7/1962

(Continued)

*Primary Examiner* — Ryan Kwiecinski
(74) *Attorney, Agent, or Firm* — Lawrence Letham

(57) ABSTRACT

A bracket orients and/or supports a guest object from a host structure that includes one or more sheets that may overlap. The sheets may include a fastener. For example, a bracket may orient a video camera/recorder supported by an article of clothing worn by a law enforcement officer. The bracket bears at least part of the weight of the object and maintains an orientation of the object. Friction between the bracket and one or more of the host sheets may resist movement of the bracket with respect to the sheet. The bracket may be installed by passing a portion of the bracket through an orifice of the sheet. When used with an overlapping arrangement of two sheet edges, friction between the bracket and each sheet edge may resist movement of the bracket with respect to each sheet edge. Consequently, the bracket may further serve to mechanically couple the two sheet edges, align, and/or maintain the alignment of the two sheet edges. When located over a fastener of the host structure, the fastener may locate, position, and/or align the bracket to the host. A bracket may provide a surface for mounting the guest to the bracket and one or more additional surfaces or braces for maintaining the bracket in generally parallel alignment with a surface of the host. The bracket consequently maintains a surface of the guest in general parallel alignment with a surface of the host.

15 Claims, 8 Drawing Sheets

(56) References Cited

U.S. PATENT DOCUMENTS

| | | | |
|---|---|---|---|
| 4,016,666 A | 4/1977 | Finn | |
| 4,048,899 A | 9/1977 | Bachhuber | |
| 4,771,927 A | 9/1988 | Ventura | |
| 4,784,199 A | 11/1988 | Wise | |
| 4,903,745 A | 2/1990 | Roman | |
| 4,974,764 A * | 12/1990 | Cantwell | A45F 5/02 224/269 |
| 5,012,335 A | 4/1991 | Cohodar | |
| 5,152,443 A | 10/1992 | Hagan | |
| 5,343,599 A * | 9/1994 | Reeves | A45F 5/02 24/36 |
| 5,538,499 A | 7/1996 | Schwenn | |
| 6,041,444 A | 3/2000 | McKinney | |
| 6,484,365 B1 * | 11/2002 | Thompson | B60J 3/0204 224/312 |
| 6,691,374 B2 * | 2/2004 | Coyne | A45F 5/02 24/3.1 |
| 7,318,568 B2 * | 1/2008 | Barouta | B65D 33/001 206/554 |
| 7,802,706 B1 * | 9/2010 | Selsor | A45F 5/02 224/269 |
| 8,026,433 B2 | 9/2011 | Place | |
| 2002/0144379 A1 * | 10/2002 | Wani | 24/49.1 |
| 2005/0045685 A1 * | 3/2005 | Sesto | A45F 5/02 224/587 |
| 2007/0193007 A1 * | 8/2007 | Otrusina | A45F 5/02 24/572.1 |
| 2008/0078792 A1 | 4/2008 | Tages | |
| 2008/0305840 A1 * | 12/2008 | Lin | 455/575.1 |
| 2009/0193693 A1 * | 8/2009 | Drake | G06Q 30/0601 40/1.5 |
| 2010/0001155 A1 * | 1/2010 | Grundy | A45F 5/02 248/231.81 |
| 2010/0199467 A1 * | 8/2010 | Morejon | A47D 15/008 24/442 |
| 2010/0254123 A1 * | 10/2010 | Brown | A42B 1/24 362/191 |
| 2012/0206334 A1 | 8/2012 | Osterhout | |
| 2013/0306693 A1 * | 11/2013 | Prestwich | A45F 5/00 224/269 |
| 2014/0231482 A1 * | 8/2014 | Chamberlayne | A45F 5/00 224/623 |
| 2014/0305976 A1 * | 10/2014 | Stallworth | A45F 5/02 224/269 |

FOREIGN PATENT DOCUMENTS

| | | |
|---|---|---|
| WO | 2011137406 A2 | 11/2011 |
| WO | 2013143571 A1 | 10/2013 |

\* cited by examiner

BRACKET FOR MOUNTING TO ONE OR MORE SHEETS

BRIEF DESCRIPTION OF THE DRAWING

Embodiments of the present invention are described with reference to the drawing, wherein like designations denote like elements, and.

Figure 1:
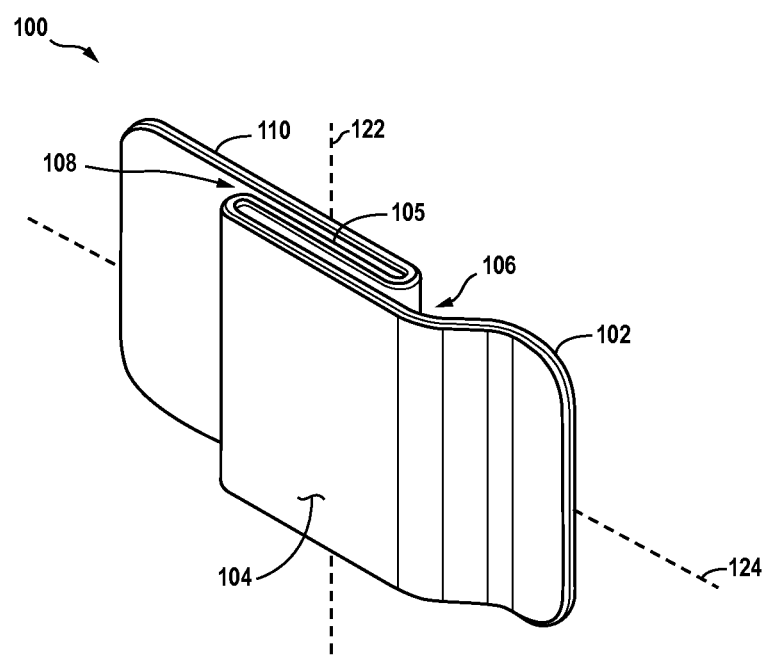
FIG. 1 is a perspective plan view of a bracket, according to various aspects of the present invention.
Figure 2:
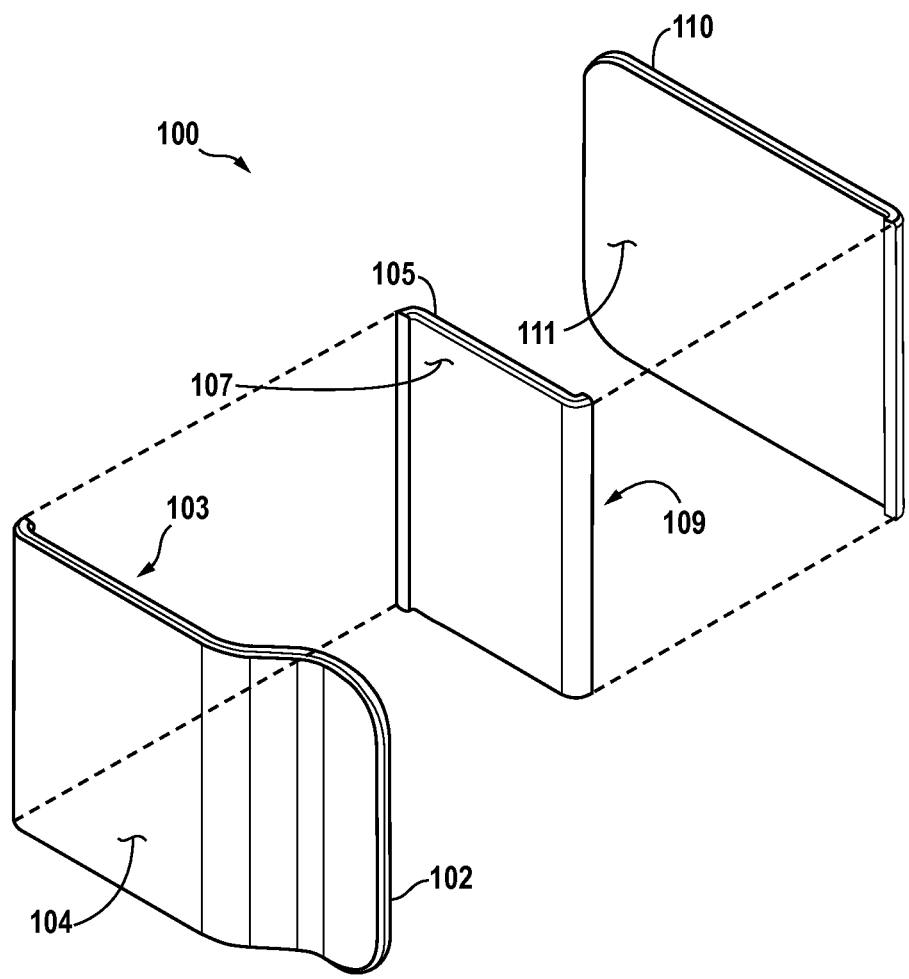
FIG. 2 is an exploded perspective plan view of the bracket of FIG. 1.
Figure 3:
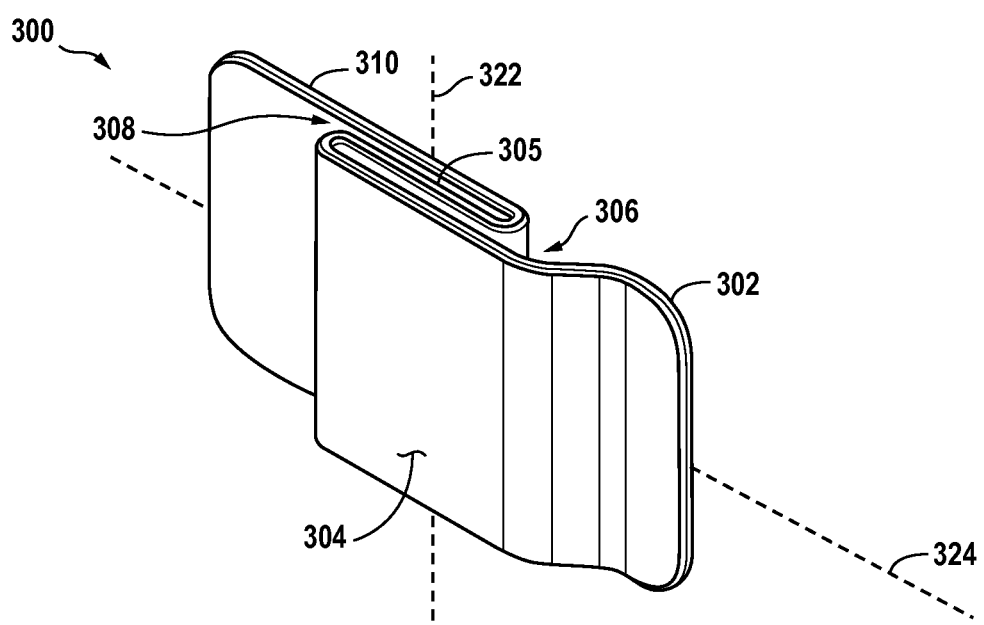
FIG. 3 is a second bracket, according to various aspects of the present invention.
Figure 4:
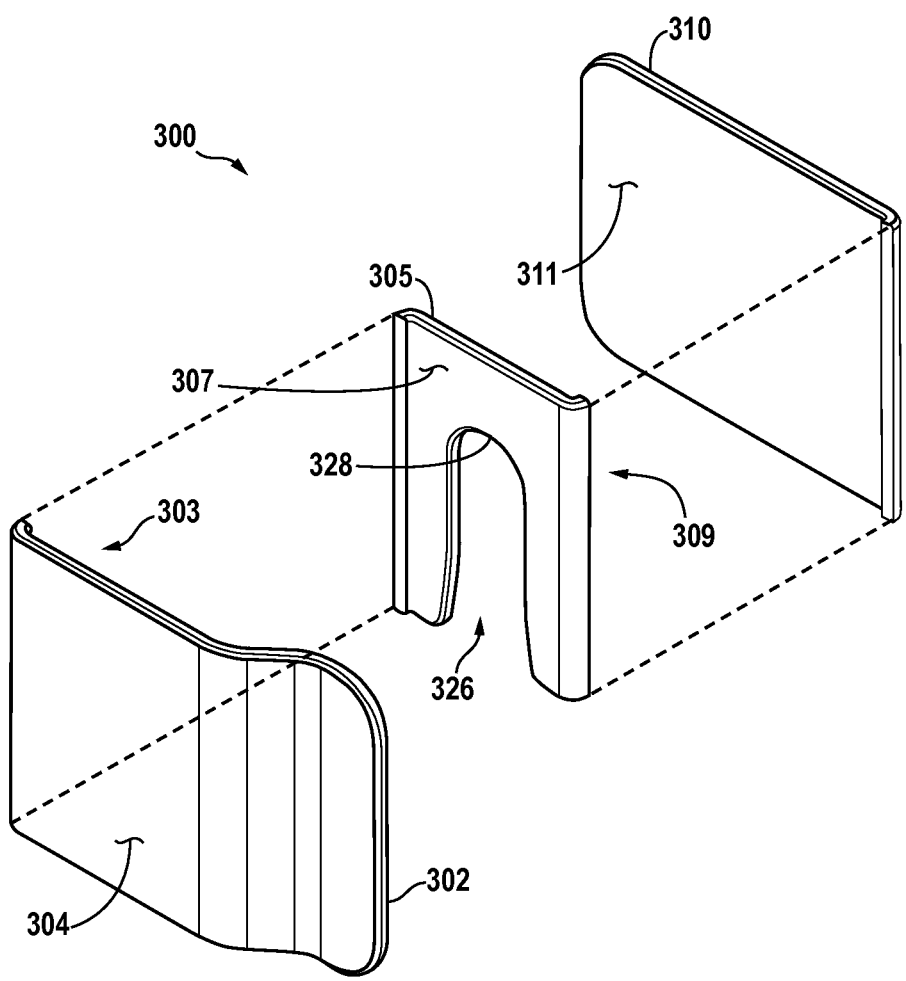
FIG. 4 is an exploded perspective plan view of the bracket of FIG. 3.
Figure 5:
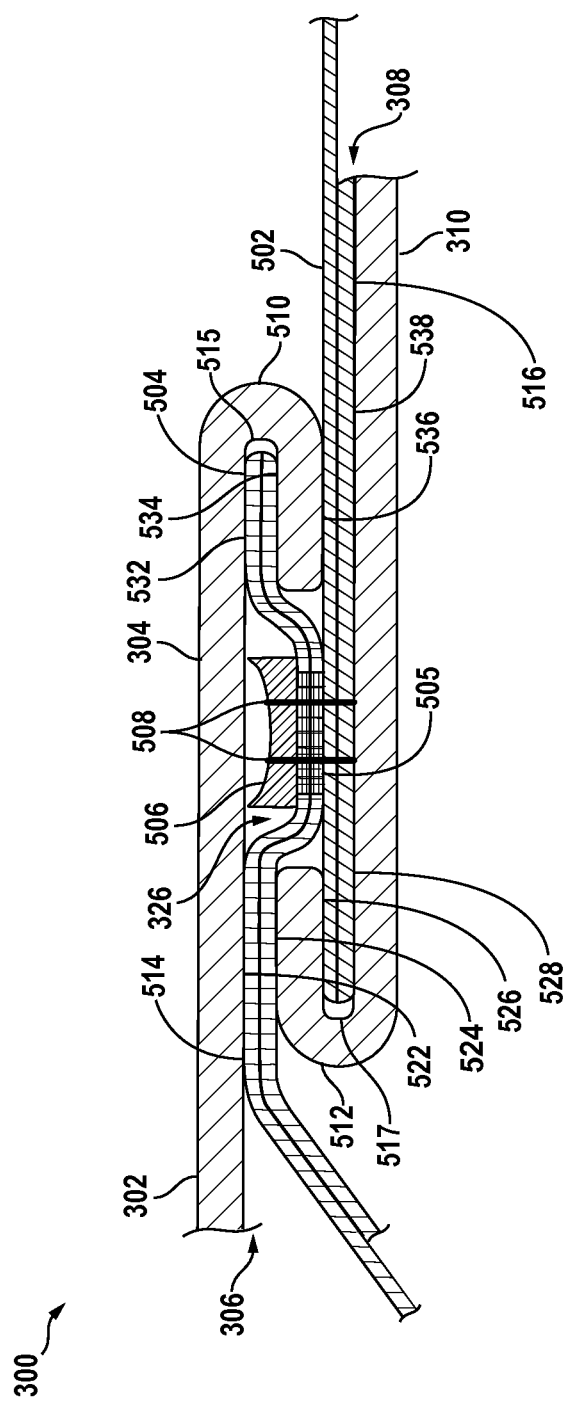
FIG. 5 is a top cross-section on axis 324 of the bracket of FIG. 3 with a conventional men's buttoned shirt.

Lines in the drawing indicate edges or changes of surface curvature as conventionally indicated by wire frame drafting technology.

DETAILED DESCRIPTION OF THE PREFERRED EMBODIMENTS

A bracket is used to mechanically couple an object, herein called a user provided object, a guest object, or guest, to a structure, herein called a host structure or host. A bracket includes any apparatus that couples (e.g., mounts, supports, holds) a guest object to a host structure. A bracket bears at least part of the weight of the guest object mounted to the bracket. A bracket may maintain an orientation of the guest with respect to the bracket. A bracket itself is supported by the host structure, for example, by being mechanically coupled to the host. A bracket transfers a weight of the guest to the host that supports the bracket. A bracket may provide a surface for supporting the guest. A bracket may provide a surface for orienting the guest.

According to various aspects of the present invention, a bracket in a first class of implementations couples a guest to a host that comprises a sheet (e.g., fabric, film, web, rolled material). Friction between the bracket and the sheet may resist movement of the bracket with respect to the sheet. The bracket may be installed by passing a portion of the bracket through an orifice of the sheet. The bracket may abut an interior of the orifice to remain in position with respect to the orifice. The bracket may be installed to abut a feature of the sheet characterized by a discontinuity in thickness (e.g. thicker, thinner, joint that joins two sheets). The bracket may include a surface adapted for abutting one or more such features. For instance a pattern of several recesses (or bumps) in a surface of a bracket may be installed against a matching pattern of bumps (or recesses) that extend into the recesses (or over the bumps), thereby increasing friction between the sheet and the bracket to resist movement of the bracket with respect to the sheet. A surface of the bracket may include a structure that conforms the sheet against an undulation, thereby increasing friction between the sheet and the bracket to resist movement of the bracket with respect to the sheet.

A bracket in a second class of implementations couples a guest to a host comprising an overlapping arrangement of two sheet edges. Friction between the bracket and each sheet edge may resist movement of the bracket with respect to each sheet edge. Consequently, the bracket may serve to mechanically couple the two sheet edges. The bracket may further serve to align and/or maintain the alignment of the two sheet edges. The sheet edges may be edges of the same sheet or of different sheets. The different sheets may be of the same material or of different materials. Friction between the bracket and either sheet or both sheets may be increased with surface features of the bracket as discussed above.

A bracket in a third class of implementations may be located over a fastener of the host structure. The fastener may be fixed to one or more of the sheets of the host, for example, to couple one or more sheets together. The bracket may abut the fastener to locate, position, and/or align the bracket to the host. By abutting the fastener, the bracket may maintain the location, position and/or alignment of the bracket with respect to the fastener. The bracket may transfer at least a portion of the weight of the guest through the bracket onto the fastener. A bracket located over a fastener may include any of the structures discussed above for increasing friction between the bracket and one or more of the sheets.

A bracket in a fourth class of implementation may provide a surface for mounting the guest to the bracket. A bracket may include one or more additional surfaces or braces for maintaining the bracket in generally parallel alignment with a surface of a sheet of the host. The bracket consequently maintains a surface of the guest in general parallel alignment with a surface of the sheet that may further accomplish general alignment with the host.

For instance, a bracket, according to various aspects of the present invention, may support a video camera from the front torso region of an article of conventional clothing (e.g., vest, shirt, jacket, coat) worn by a law enforcement officer. Such an article of clothing generally comprises two edges fastened vertically at the front of the clothing by a row of fasteners joined (e.g., sewn, adhered, crimped) to a first edge, while the second edge, comprising holes or mating fasteners, overlaps the first. Any conventional fastener technology may be used (e.g., button with button hole in sheet, snaps, quarter turn fasteners with grommet in sheet, zipper).

The guest object may be unpowered (e.g., sign, name tag, badge), provide power (e.g., battery, photocell), and/or consume power (e.g., flashlight, audio alarm, music player, record information from the surroundings (e.g., location, temperature, RFID codes, bar or QR codes, audio and/or video (e.g., camera, microphone, digital recorder)), communicate between persons and/or machines (e.g., beacon, identifier, reader, interrogator, transponder, transceiver, mobile phone)). The guest object may be electrically coupled (e.g., wirelessly or cabled) to additional units located nearby (e.g., a battery pack in a pocket of the same or a different article of clothing).

A bracket, according to various aspects of the present invention, may include the features of any one or more of the implementations discussed above in any practical combination. According to the present invention, brackets of FIGS. 1-4 illustrate several combinations of these features.

For example, bracket 100 of FIGS. 1, 2, 7, and 8, performs the functions of a bracket as discussed in any implementation above. Bracket 100 couples a guest object to a host comprising the overlapping edges of two sheets. Bracket 100 comprises a base 102, a wall 105, and a brace 110. The base includes a guest object orientation surface 104. A first region 106, adjacent wall 105, between base 102 and wall 105, includes opposing surfaces to mount onto a first edge of a sheet (not shown). Surface 103 of base 102 opposes surface 107 of wall 105. A second region 108, adjacent wall 105, between brace 110 and wall 105, includes opposing surfaces to mount onto a second edge of the same or a different sheet (not shown). Surface 109 of wall 105 opposes surface 111 of brace 110. Wall 105 of bracket 100 provides a first opposing surface (e.g., 107) that defines region 106 and a second opposing surface (e.g., 109) that defines region 108.

Brackets according to various aspects of the present invention may include surfaces (e.g., planar and/or not planar) that extend to a border defined in terms of a change of functions of the surfaces. Where a function of a particular surface is not performed, that portion of the bracket is not included in the definition of that particular surface. For example, each surface identified by reference character of the drawing includes a generally planar area. Such a planar area extends to an edge of a bracket and/or to a curved portion of a bracket demarcating a border between surfaces. A curved portion of bracket 100 or 300 generally performs a different function than the planar areas identified as surfaces.

Axes 122 and 124 are generally perpendicular to each other and pass through a geometric center of bracket 100. Axis 122 may correspond to the edge of one or more sheets onto which bracket 100 is mounted. Axis 122 is shown vertical and corresponds to the pull of gravity. Bracket 100 of course may be installed with respect to edges of sheets that are not vertical. For instance bracket 100 may be installed on sheets that have edges generally parallel to axis 122 while the pull of gravity is in a direction closer to axis 124 than axis 122. An intersection of axes 122 and 124 may correspond to a center of mass of bracket 100, or of a combination of bracket 100 and the guest.

Figure 9:
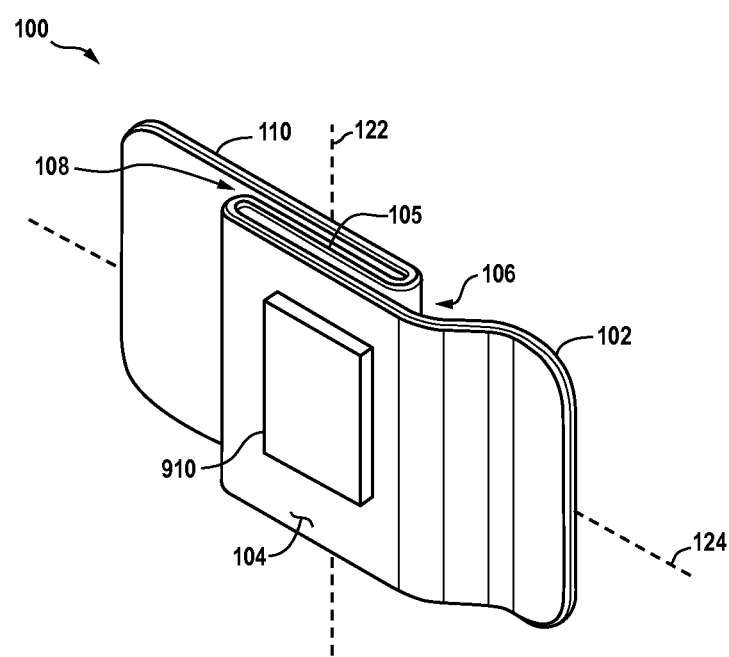
FIG. 9 is the perspective plan view of the bracket of FIG. 1 that includes a coupler for an object.

A base provides a guest object orientation surface. A base may include one or more fasteners (e.g., mechanical, magnetic, hook and loop) for securing the guest object to the orientation surface. For example referring to FIG. 9, orientation surface 104 of base 102 may include fastener (e.g., coupler) 920 for securing a guest object to bracket 100. A brace may be located further from a center of the base than any portion of the base that extends from such a center. A base may include (integrally or by attachment) material that counterbalances an uneven distribution of weight that would otherwise exist in the base, the bracket, or a combination of the bracket and the guest. A base may conduct heat between the guest and the bracket.

A base may include a brace (e.g., integral, or coupled to the base) to perform one or more of the functions of a brace as discussed above. Base 102, for example, includes an integral portion that extends beyond a symmetric portion of guest object orientation surface 104 centered at the intersection of axes 122 and 124. The brace portion of base 102 resists turning of the guest object mounting surface on axis 124 (e.g., generally perpendicular to the overlapping sheet edges). Base 102 (in cooperation with brace 110) also resists turning of the guest object mounting surface on axis 122.

A guest object orientation surface provides a reference for positioning the guest object (not shown) with respect to bracket 100. For example, guest object orientation surface 104 provides a planar surface coplanar with axes 122 and 124. A guest object orientation surface may further include features and/or materials for supporting the guest object, holding the guest object against the guest object orientation surface, and/or releasing the guest object from bracket 100. For example, a guest object may be retained (e.g., held, fastened, mounted) against surface 104 with any conventional technology (e.g., ledges, pockets, orifices into or through base 102, hook and loop fabric adhered to surface 104, fasteners, snaps, keyholes, latches, twist connections, magnets, adhesives).

A brace may perform one or more of the functions of a brace as discussed above. Brace 110, for example, resists turning of the guest object orientation surface on axis 124 (e.g., generally perpendicular to the overlapping sheet edges). Brace 110 (in cooperation with base 102) also resists turning of the guest object orientation surface on axis 122.

According to various aspects of the present invention, a region having opposing surfaces mounts a bracket to one or more sheets. The region and sheet may cooperate to restrict movement of the bracket away from the sheet. One or more surfaces of the region may occasionally abut the sheet to restrict movement of the bracket away from the sheet. One or more of the surfaces of the region may be in generally continuous contact with the sheet. Contact may give rise to stiction and/or friction between the bracket and the sheet. Stiction and/or friction may resist movement and/or removal of the sheet from the region.

In some implementations, according to various aspects of the present invention, a first region and a second region each contribute some friction to resist movement and/or removal of the bracket from one or more sheets. A first region includes opposing surfaces that mount a first sheet edge. The first opposing surfaces may further apply no pressure or any suitable pressure to resist movement and/or removal of the first sheet edge from the region. The region may be spread open to accept the first sheet edge and released to engage the first sheet edge. Engagement may include friction. For example, first region 106 may comprise two opposing generally flat surfaces treated or textured to provide suitable friction against one or both sides of the first sheet. Engagement may include abutting a feature of the region with a feature of one or more of the first sheet and the second sheet as discussed herein.

A second region includes opposing surfaces that mount a second sheet edge and may further apply no pressure or any suitable pressure to resist movement and/or removal of the second sheet edge from the region. The region may be spread open to accept the second sheet edge and released to engage the second sheet edge. Engagement may include friction. For example, second region 110 may comprise two opposing generally flat surfaces treated or textured to provide suitable friction against one or both sides of the first sheet. Engagement may include abutting a feature of the region with a feature of one or more of the first sheet and the second sheet as discussed herein.

When a bracket is formed for use on two sheet edges, one region cooperates with each sheet edge. Each region may have a depth (along axis 124), a length (parallel to axis 122), and a width (for accepting sheet thickness). Each region may be adapted to receive a sheet of different dimensions and/or properties. Regions may be substantially identical in function as to each sheet edge (e.g., applying substantially identical friction, contacting substantially identical areas, facilitating substantially identical resistance to rotation about axis 124).

Opposing surfaces of a region may each have an area of contact (occasional or continuous) with a sheet edge measured with reference to depth and length. The depth and length are constants for bracket 100 for regions 106 and 108. Other implementations according to various aspects of the present invention include areas of contact of geometric shape such as square, rectangular, triangular, polygonal, circular, oval, or teardrop.

In other implementations friction and/or resistance to rotation about axis 124 is greater for region 106 than for region 108. The user may find it easier to mount a sheet edge into region 106 than a sheet edge into region 108.

For bracket 100, first region 106 and second region 108 are adapted for receiving identical amounts of identical sheet edge materials and construction. Consequently, regions 106 and 108 are substantially identical in function as to each sheet edge by applying substantially identical friction, contacting substantially identical areas, and facilitating substantially identical resistance to rotation about axis 124.

Bracket 100 may be formed of one sheet of material (or a laminate of sheet materials) in any conventional manner (e.g., stamped, folded). Bracket 100 may be formed of one material (e.g., extruded, accumulated depositions, 3D printed, cast). Bracket may be formed of components in any conventional manner that are fixed to each other (e.g., bonded, glued, laser welded, welded, soldered). One or more of the surfaces of bracket 100 may be formed, and/or machined (e.g., cast, deposited, stamped, etched, textured) and/or treated with additional conventional material (e.g., coated, enveloped, dipped, painted) to increase friction between bracket 100, the host, and or the guest. Bracket 100 may be formed of any conventional plastic for light weight and/or resiliency (e.g., nylon, polycarbonate, inorganic polymers, polyethylene, rubber) and/or formed of metal for high spring tension and durability (e.g., stainless steel, alloys of steel). Bracket 100 may be formed of laminated materials, for instance, several solid, stranded, or perforated sheets, to achieve design goals involving the outer surface, resiliency, weight, and durability.

When mounted on a conventional article of clothing (e.g., vest, shirt, jacket, coat), brace 110 is located inside the clothing and may rest against the body of the person wearing the clothing. Further, base 102 is located outside the clothing and may rest against the front of the clothing.

A bracket, according to various aspects of the present invention, may engage a feature of a surface and/or a feature of a sheet. Engagement of a feature may replace or supplement engagement by friction as discussed above.

A bracket, as discussed above, may couple a guest object to a host comprising the overlapping edges of two sheets where the bracket engages a feature of a sheet. The feature may be characterized by a discontinuity in thickness (e.g. thicker, thinner, joint that joins two sheet edges). The feature may comprise at least one fastener that fastens a first sheet edge to a second sheet edge of the same or a different sheet. The bracket may engage or maintain engagement of the feature by gravity.

For example, bracket 300 of FIGS. 3, 4, 5, 6A-6D, performs the functions of a bracket as discussed above. The structures and functions of bracket 300 may be as discussed above with reference to bracket 100 and supplemented as further described below. Bracket 300 engages a fastener. Cooperation with the fastener may accomplish maintaining the location, position, and/or orientation of bracket 300 after installation. Cooperation with the fastener may contribute to supporting bracket 300. Consequently, bracket 300 in cooperation with a fastener locates, positions, orients, and/or supports a guest object. Bracket 300 includes a wall having an opening that engages a feature of the sheet and maintains bracket 300 in contact by gravity with the feature of the sheet.

Bracket 300 comprises a base 302, a wall 305, and a brace 310. The base includes a guest object orientation surface 304. A first region 306, adjacent wall 305, between base 302 and wall 305, includes opposing surfaces to mount onto a first edge of a sheet (not shown). Surface 303 of base 302 opposes surface 307 of wall 305. A second region 308, adjacent wall 305, between brace 310 and wall 305, includes opposing surfaces to mount onto a second edge of the same or a different sheet (not shown). Surface 309 of wall 305 opposes surface 311 of brace 310. Wall 305 of bracket 300 provides a first opposing surface (e.g., 307) that defines region 306 and a second opposing surface (e.g., 309) that defines region 308. Axes 322 and 324 refer to bracket 300 in a manner analogous to the way axes 122 and 124 refer to bracket 100.

Wall 305 comprises opening 326 including load-bearing surface 328. Opening 326 is sized and formed to accept (e.g., locate, abut, hold, retain, at least partially enclose, at least partially capture) a wide variety of fasteners used to join sheet edges. For example, opening 326 may be sized to accept one or more fasteners used conventionally with clothing as discussed above.

Load-bearing surface 328 may rest on any desired component of a fastener (e.g., fastener itself, material that binds the fastener to the sheet, spacer that positions the fastener away from the sheet). For example, a component or portion of a fastener may be located in region 306 or region 308. One or more components or portions of a fastener may be located in region 306 and region 308.

Axes 322 and 324 may pass through a center of the fastener. Axis 322 may be centrally located in opening 326. Surface 328 may be located so that the center of mass of a combination of bracket 300 and guest object mounted to surface 304 is suitably below the abutting surface of the fastener and surface 328. By locating surface 328 in this way, the center of mass, if allowed to move, will move on an arc as a pendulum. Regions 306 and 308 may have greater resistance to movement on an arc than movement in one of axes 322 or 324.

When mounted on a conventional article of clothing (e.g., vest, shirt, jacket, coat), brace 310 is located inside the clothing and may rest against the body of the person wearing the clothing. Further, base 302 is located outside the clothing and may rest against the front of the clothing. One or more conventional clothing fasteners (e.g., button, snap, latch, zipper pull, may occupy region 326 and or abut surface 328. When bracket 300 is installed on such an article of clothing, in an exemplary orientation, a portion of a fastener rests on load-bearing surface 328 as gravity pulls bracket 300 and guest object downward on a vertical axis 322. Accepting the fastener may be accomplished by sizing the cavity formed by regions 306 and 308 so that the fastener interferes with one or more of the opposing surfaces of these regions and consequently will not slip out of opening 326 during normal usage. Opening 326 may accept a fastener and further interfere with (e.g., bind, latch, adhere to) the fastener to retain the fastener in opening 326.

Bracket 300 may be used with a conventional men's buttoned shirt. For example, bracket 300 of FIG. 5 couples at guest object orientation surface 304 a guest object (not shown) to a host (not shown) comprising the overlapping edges of one sheet (e.g., one shirt) where the bracket engages a feature of the sheet. The feature comprises a button that fastens a first sheet edge to a second sheet edge of the same sheet. The installation of bracket 300 of FIG. 5 includes a shirt having first sheet edge 502, second sheet edge, 504, button hole 505, and button 506. In this installation bracket 300 further includes surface coupler 510, surface coupler 512, passages 514-517, surfaces 522-528, and surfaces 532-538.

First sheet edge 502 is located in region 308. First sheet edge 502 includes a conventional overlap hem so that a double thickness of fabric is available for sewing button 506 to first sheet edge 502 via threads 508. Region 308 includes passage 516 and passage 517. Surfaces 526 and 538 of passage 516 may cooperate with first sheet edge 502, according to various implementations (e.g., by sliding thereon, abutting occasionally, abutting continually, grasping). Surfaces 526 and 528 of passage 517 may cooperate with first sheet edge 502, according to various implementations (e.g., by sliding thereon, abutting occasionally, abutting continually, grasping).

Second sheet edge 504 is located in region 306. Second sheet edge 504 includes a conventional overlap hem so that a double thickness of fabric is available to form conventional sewn button hole 505 in second sheet edge 504. Region 306 includes passage 514 and passage 515. Surfaces 522 and 524 of passage 514 may cooperate with second sheet edge 504, according to various implementations (e.g., by sliding thereon, abutting occasionally, abutting continually, grasping). Surfaces 532 and 534 of passage 515 may cooperate with second sheet edge 504, according to various implementations (e.g., by sliding thereon, abutting occasionally, abutting continually, grasping).

A surface coupler joins one or more surfaces to form a unified structure. A surface coupler may provide a pivot for spreading a region. A surface coupler may provide resilience, as a region is opened (e.g., by a user for inserting a sheet edge, by resilient or stiff sheet material forced into the region). A surface coupler may form a pocket. A surface coupler may align surfaces to oppose each other. A surface coupler may define the width of a region.

For example, surface coupler 510 (512) joins surfaces 532 and 534 (526 and 528) to form the unified structure of bracket 300. Surface coupler 510 (512) provides a pivot for opening region 306 (308). Surface coupler 510 (512) provides resilience, as region 306 (308) is opened (e.g., by a user for inserting a sheet edge 504 (502). Surface coupler 510 (512) may further provide resilience when a sheet edge 504 (502) of resilient or stiff sheet material is forced into the region, possibly slightly compressing the sheet material (e.g., increasing friction, grasping). Surface coupler 510 (512) forms a pocket in passage 515 (517) by closing the passage in at least one direction. Surface coupler 510 (512) aligns surfaces 532 and 534 (526 and 528) to oppose each other. Surface coupler 510 (512) defines the width of region 306 (308).

A pocket closes a passage in at least one direction. A pocket accepts (e.g., locate, abut, hold, retain, at least partially enclose, at least partially capture) a sheet edge, facilitates aligning a bracket to a sheet edge, and/or maintains a desired alignment of a bracket with a sheet edge. An interior surface of a pocket may be formed to accomplish one or more of these functions. An interior surface of a pocket may be configured to cooperate with a sheet edge characterized by a given shape and/or composition. A narrow portion of a pocket may serve to cooperate with a portion of a sheet edge that includes suitable resiliency, suitable wear resistance to friction of the bracket against the sheet edge, and/or particular features (e.g., rolled hem, rib decoration, embroidered edge treatment, bead of edge coating, zipper teeth, pull string channel).

Figure 6A:
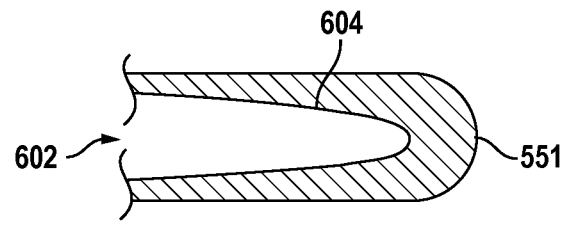
FIGS. 6A, 6B, 6C, and 6D are cross-sectional views of four implementations that may each be used in place of the portion of region 306 near bend 510 of FIG. 5, according to various aspects of the present invention.
Figure 6B:
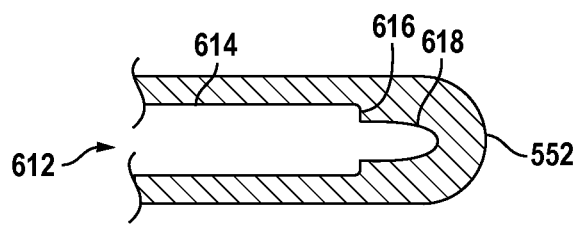
Figure 6C:
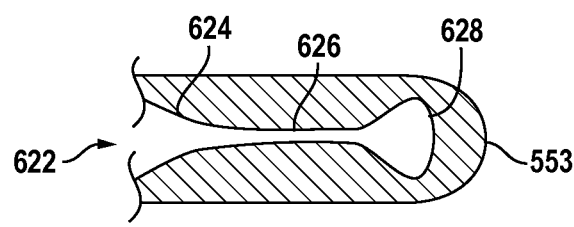

Pockets, according to various aspects of the present invention, may vary as to the configuration of an interior surface. For example, pocket 602 of FIG. 6A is formed in coupler 551, pocket 612 of FIG. 6B is formed in coupler 552, pocket 622 of FIG. 6C is formed in coupler 553, and pocket 632 is formed in coupler 554. Couplers 551-554 perform the functions of coupler 510 or 512. Implementations of brackets, according to various aspects of the present invention, may include the structures and functions of bracket 300 in combination with one or more of couplers 551-554 (in place of couplers 510 and/or 512) or pockets 602, 612, 622, or 632. Implementations of brackets, according to various aspects of the present invention, may include the structures and functions of bracket 100 in combination with one or more of the couplers and pockets discussed herein, by analogy with bracket 300.

Pocket 602 of FIG. 6A provides a tapered passage 604 having a width that decreases with depth into pocket 602.

Pocket 612 of FIG. 6B provides a stepped passage 612 that includes step 616 between passage 614 and passage 618. Passage 614 has a constant width. Passage 618 has a tapered width similar to passage 604. Step 616 accomplishes a discontinuity in width. Step 616 may be configured (e.g., angled, further include a grip) to grasp a sheet edge.

Pocket 622 of FIG. 6C provides a tapered entry passage 624, a transition passage 626, and a sheet edge feature accommodation passage 628. Passage 624 has a width greater than a maximum width of transition passage 626. Passage 628 has a width greater than a maximum width of transition passage 626. Sheet edge feature accommodation passage 628 is symmetric in cross section.

Figure 6D:
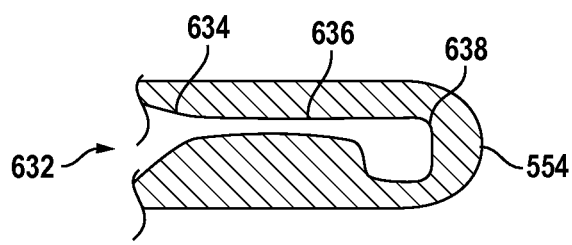

Pocket 632 of FIG. 6D provides a tapered entry passage 634, a transition passage 636, and a sheet edge feature accommodation passage 638. Passage 634 has a width greater than a maximum width of transition passage 636. Passage 638 has a width greater than a maximum width of transition passage 636. Sheet edge feature accommodation passage 638 is asymmetric in cross section.

Figure 7:
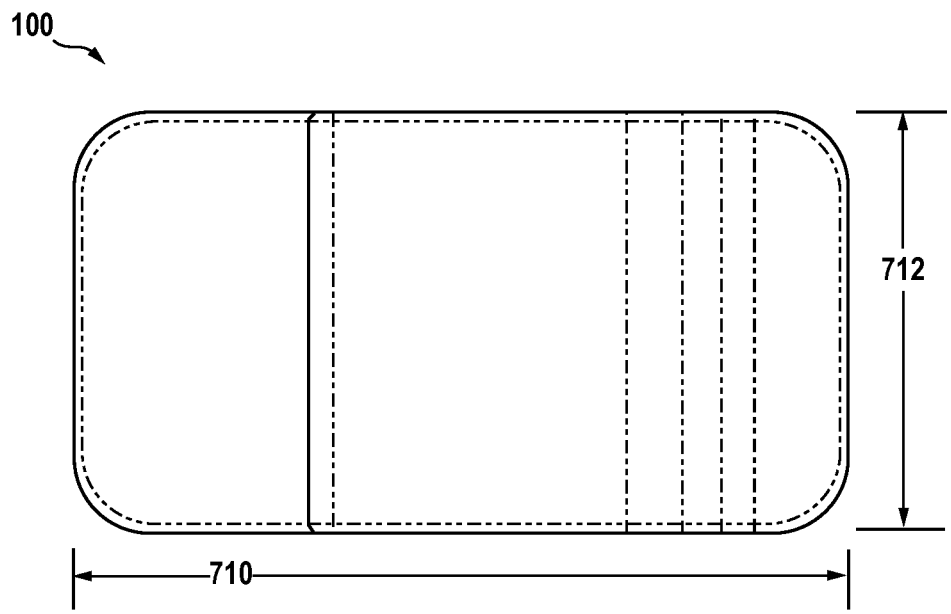
FIG. 7 is a front plan view of the bracket of FIG. 1.
Figure 8:
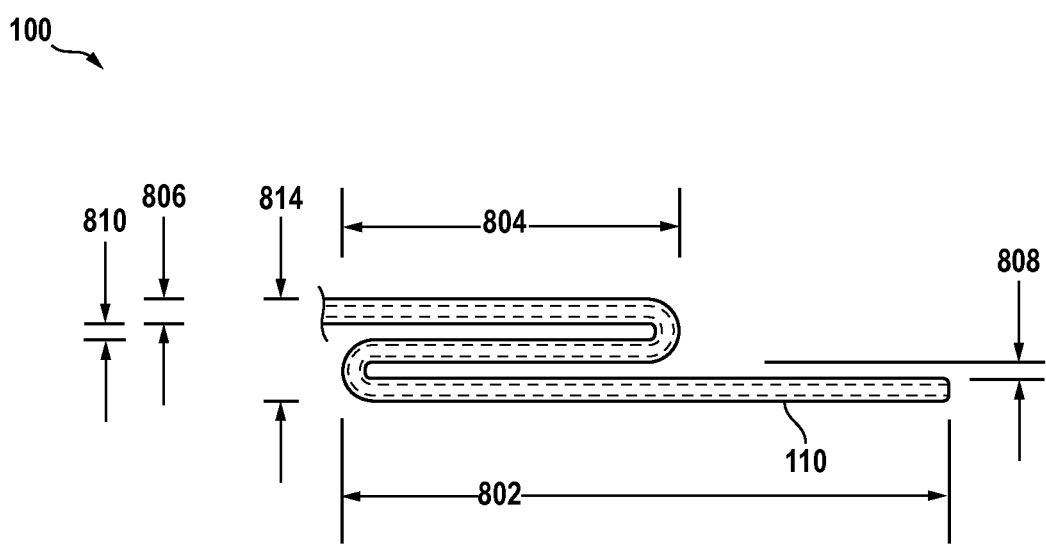
FIG. 8 is a top plan view of the bracket of FIG. 1.

FIGS. 7 and 8 together with Table 1 disclose preferred ranges of dimensions of bracket 100 (and of bracket 300 by analogy) for mounting as a guest a forward facing video camera/recorder to the clothing about the chest of a user. The video camera/recorder weighs about 25 grams. Bracket 100 (300) weighs about 45 (40) grams.

TABLE 1

| Description | Dimension in Inches | Comment |
| --- | --- | --- |
| Length 710 of bracket 100 (300) | 4 | |
| Height 712 of bracket 100 (300) | 1 to 3 | |
| Length 802 of brace 110 (310) | 2.5 | |
| Width 804 of wall 105 (305) | 1.5 | |
| Width 806 of material of bracket 100 (300) | 0.02 to 0.2 | Sheet metal used for low values. Higher values use plastic for lighter bracket weight. |
| Width 808 of region 108 (308) | 0.05 to 0.2 | To accommodate sheets |
| Width 810 of region 106 (306) | 0.05 to 0.2 | of a desired range of thickness, surface couplers may be formed to have relatively greater resilience than other portions of the bracket. |
| Width 814 of bracket 100 (300) | 0.5 | |
| Width of opening 326 (not shown) | 7/8 | |

Example Implementations

As a first example, a bracket provides support for a user-provided object from a sheet. The sheet includes a fastener. The bracket includes a base that mounts the object, a brace, and a wall connected in series between the base and the brace. A first region between the brace and the wall is configured to envelope a portion of an edge of the sheet.

In a second example, a bracket provides support for a user-provided object from a sheet. The sheet includes a fastener. The bracket includes a base that mounts the object, a brace, and a wall connected in series between the base and the brace. The wall comprises an opening to maintain the bracket in contact by gravity with the fastener of the sheet. The center of gravity of the bracket is below the fastener of the sheet. A first region between the brace and the wall is configured to envelop a portion of an edge of the sheet.

In a third example, a bracket provides support for a user-provided object from a sheet. The sheet includes a fastener.

The bracket includes a base that mounts the object, a brace, and a wall connected in series between the base and the brace. The base comprises a second fastener for mounting the object. A first region between the brace and the wall is configured to envelop a portion of an edge of the sheet.

In a fourth example, a bracket provides support for a user-provided object from a sheet. The sheet includes a fastener. The bracket includes a base that mounts the object, a brace, and a wall connected in series between the base and the brace. The base comprises a second fastener for mounting the object. The second fastener includes a hook and loop fabric. A first region between the brace and the wall is configured to envelop a portion of an edge of the sheet.

In a fifth example, a bracket provides support for a user-provided object from a sheet. The sheet includes a fastener. The bracket includes a base that mounts the object, a brace, and a wall connected in series between the base and the brace. A portion of the brace is located further from a center of the base than any other portion of the base. A first region between the brace and the wall is configured to envelop a portion of an edge of the sheet.

In a sixth example, a bracket provides support for a user-provided object from a sheet. The sheet includes a fastener. The bracket includes a base that mounts the object, a brace, and a wall connected in series between the base and the brace. A first region between the brace and the wall is configured to envelop a portion of an edge of the sheet. The brace and wall resist movement of the sheet by friction with the sheet.

In a seventh example, a bracket provides support for a user-provided object from a sheet. The sheet includes a fastener. The fastener couples the sheet to a second sheet. The bracket includes a base that mounts the object, a brace, and a wall connected in series between the base and the brace. A first region between the brace and the wall is configured to envelop a portion of an edge of the sheet. A second region between the base and the wall is configured to envelop a portion of an edge of the second sheet.

In an eighth example, a bracket provides support for a user-provided object from a sheet. The sheet includes a fastener. The fastener couples the sheet to a second sheet. The bracket includes a base that mounts the object, a brace, and a wall connected in series between the base and the brace. The bracket comprises a second brace coupled to the base. A first region between the brace and the wall is configured to envelop a portion of an edge of the sheet. A second region between the base and the wall is configured to envelop a portion of an edge of the second sheet.

In a ninth example, a bracket provides support for a user-provided object from a sheet. The sheet includes a fastener. The fastener couples the sheet to a second sheet. The bracket includes a base that mounts the object, a brace, and a wall connected in series between the base and the brace. The bracket comprises a second brace coupled to the base. A portion of the second base is located further from a center of the base than any other portion of the base. A first region between the brace and the wall is configured to envelop a portion of an edge of the sheet. A second region between the base and the wall is configured to envelop a portion of an edge of the second sheet.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. base.

What is claimed is:

1. A bracket for supporting a user-provided object from a provided clothing worn by the user, the clothing comprising a first sheet, a second sheet, and a fastener, the fastener for coupling the first sheet to the second sheet, the bracket comprising:

a base having an outer surface and an inner surface;

a brace having an outer surface and an inner surface; and a wall having an outer surface, an inner surface, a bottom edge, and an opening formed at the bottom edge thereof, the base, the wall, and the brace coupled in series, the outer surface of the wall positioned opposite a portion of the inner surface of the base to form a first region, the inner surface of the wall positioned opposite a portion of the outer surface of the brace to form a second region; wherein the bracket is configured to be coupled to the clothing of the user while the fastener couples the first sheet to the second sheet;

a portion of an edge of the first sheet is configured to be positioned in the first region;

a portion of an edge of the second sheet is configured to be positioned in the second region;

the opening is configured to be positioned at least partially around the fastener;

at least a portion of an edge of the opening is configured to contact the fastener;

the inner surface of the brace is configured to be positioned proximate to the user;

the outer surface of the base is configured to be positioned distal to the user and outside of the clothing; and the user-provided object is configured to be coupled to the outer surface of the base.

2. The bracket of claim 1 wherein the bracket further comprises a coupler positioned on the outer surface of the base for coupling the user-provided object to the base.

3. The bracket of claim 2 wherein the coupler comprises a hook and loop fabric.

4. The bracket of claim 2 wherein the coupler comprises a magnet.

5. The bracket of claim 2 wherein the coupler comprises a mechanical coupler.

6. The bracket of claim 1 wherein the outer surface of the brace and the inner surface of the wall are configured to retain the portion of the edge of the first sheet in the first region by friction.

7. The bracket of claim 1 wherein the inner surface of the base and the outer surface of the wall are configured to retain the portion of the edge of the second sheet in the second region by friction.

8. The bracket of claim 1 wherein the fastener is configured to at least partially support the weight of the user-provided object when the fastener is contacted by the at least portion of the edge of the opening and the user-provided object is coupled to the outer surface of the base.

9. The bracket of claim 1 wherein: at least one of the first region and the second region are configured to retain by friction the portion of the edge of the first sheet and the second sheet respectively to maintain the orientation of the bracket with respect to the clothing and to support at least in part a weight of the user-provided object; and the fastener is configured to at least partially support the weight of the user-provided object when the fastener is contacted by the at least the portion of the edge of the opening.

10. The bracket of claim 1 wherein: the fastener comprises a button; and the edge of the opening is configured to contact at least one of the button and a thread that couples the button to one of the first sheet and the second sheet.

11. A bracket for supporting a user-provided object from a provided clothing worn by the user, the clothing comprising a first sheet, a second sheet, and a fastener, the fastener for coupling the first sheet to the second sheet, the bracket comprising:
 a base;
 a brace; and
 a wall having an opening at a bottom edge thereof, wherein the base, the wall, and the brace are coupled in series to form a serpentine shape that positions a portion of the base opposite a portion of the brace with the wall positioned between the portion of the base and the portion of the brace to form a first region between a first side of the wall and a first side of the base and a second region between a second side of the wall and a first side of the brace; wherein
 The bracket is configured to be coupled to the clothing of the user while the fastener couples the first sheet to the second sheet;
 a portion of the first sheet is configured to be positioned in the first region and retained in the first region by friction;
 a portion of the second sheet is configured to be positioned in the second region and retained in the second region by friction;
 the fastener is configured to be positioned at least partially in the opening;
 at least a portion of an edge of the opening is configured to contact the fastener to at least partially support a weight of the user-provided object;
 a second side of the base is configured to be positioned outside of the clothing; and
 the object is configured to be coupled to the second side of the base.

12. The bracket of claim 11 wherein a width of at least one of the first region and the second region is tapered.

13. The bracket of claim 11 wherein a width of at least one of the first region and the second region includes a discontinuity for grasping an edge of the first sheet and the second sheet respectively.

14. The bracket of claim 11 wherein a width of at least one of the first region and the second region includes a transition passage.

15. The bracket of claim 11 wherein the bracket further comprises a coupler positioned on the second side of the base for coupling the user-provided object to the base.

* * * * *